(12) United States Patent
Zhang et al.

(10) Patent No.: US 11,058,108 B2
(45) Date of Patent: Jul. 13, 2021

(54) STABLE HIGH STRENGTH OIL-IN-WATER EMULSIONS

(71) Applicant: Dow AgroSciences LLC, Indianapolis, IN (US)

(72) Inventors: Hong Zhang, Indianapolis, IN (US); Holger Tank, Zionsville, IN (US); F. Nelson Keeney, Carmel, IN (US); Mei Li, Westfield, IN (US); Marco Antonio Tavares Do Nascimento, Atibaia (BR)

(73) Assignee: Corteva Agriscience LLC, Indianapolis, IN (US)

( * ) Notice: Subject to any disclaimer, the term of this patent is extended or adjusted under 35 U.S.C. 154(b) by 0 days.

(21) Appl. No.: 14/510,289

(22) Filed: Oct. 9, 2014

(65) Prior Publication Data

US 2015/0024939 A1 Jan. 22, 2015

Related U.S. Application Data

(63) Continuation of application No. 13/463,848, filed on May 4, 2012, now abandoned.

(60) Provisional application No. 61/482,716, filed on May 5, 2011.

(51) Int. Cl.
*A01N 25/04* (2006.01)
*A01N 25/30* (2006.01)
*A01N 57/20* (2006.01)
*A01N 43/40* (2006.01)

(52) U.S. Cl.
CPC ............. *A01N 25/04* (2013.01); *A01N 25/30* (2013.01); *A01N 43/40* (2013.01); *A01N 57/20* (2013.01)

(58) Field of Classification Search
None
See application file for complete search history.

(56) References Cited

U.S. PATENT DOCUMENTS

| | | | |
|---|---|---|---|
| 4,440,562 A | 4/1984 | Prill | |
| 4,822,405 A | 4/1989 | Martin et al. | |
| 6,369,001 B1 | 4/2002 | Jimoh | |
| 6,689,716 B2 | 2/2004 | Sabacky et al. | |
| 6,713,433 B2 * | 3/2004 | Jimoh | 504/127 |
| 2005/0233906 A1 | 10/2005 | Schnabel et al. | |
| 2010/0167929 A1 | 7/2010 | Carter et al. | |
| 2010/0184599 A1 | 7/2010 | Parrish et al. | |
| 2011/0082039 A1 | 4/2011 | Keeney et al. | |

FOREIGN PATENT DOCUMENTS

| | | |
|---|---|---|
| CN | 101406202 A | 4/2009 |
| GB | 2267825 * | 5/1992 |
| GB | 2267825 A | 12/1993 |
| WO | 2011/023758 A2 | 3/2011 |

OTHER PUBLICATIONS

Fundamentals of Chemistry. Document [online]. University of Wisconsin. 2000. Retrieved from the internet: <URL: http://www.chem.wisc.edu/deptfiles/genchem/sstutorial/FunChem.htm>.

Emulsion definition. Dictionary [online]. The free dictionary. 2012. Retrieved from the internet: <URL:http://encyclopedia2.thefreedictionary.com/Oil-in-water+emulsion>.

PCT/US2012/036422 International Search Report and the Written Opinion of the International Searching Authority dated Sep. 7, 2012.

Uniqema "The HLB System: Systematic method for selecting the most effective nonionic emulsifier(s) for any given application" 2005. www.crodalubricants.com/download.aspx?s=133&m=doc&id=267.

* cited by examiner

*Primary Examiner* — Alton N Pryor

(57) ABSTRACT

Novel high-strength herbicidal oil-in-water emulsions containing a water soluble salt of glyphosate and an oil soluble herbicide active ingredient show enhanced stability to oil phase coalescence and active ingredient crystallization by the use of specific surfactants and water immiscible organic solvents.

19 Claims, No Drawings

STABLE HIGH STRENGTH OIL-IN-WATER EMULSIONS

This application is a Continuation of U.S. NonProvisional patent application Ser. No. 13/463,848 filed May 4, 2012 which claims the benefit of U.S. Provisional Patent Application Ser. No. 61/482,716 filed May 5, 2011.

BACKGROUND

A common method of herbicidal treatment in agricultural endeavors is to treat a field to remove or control unwanted vegetation in preparation for planting a crop plant or seed, a method otherwise known as a "burndown" herbicide treatment. However, single herbicides typically lack the weed control spectrum, e.g., the range of weed species effectively controlled by the herbicide, to fully control the diversity of weeds in such an environment and therefore, it is common to apply two or more herbicides simultaneously in order to achieve the desired spectrum of control with the burndown treatment. To facilitate this application of two or more herbicides, the herbicides are often sold separately and mixed in a spray tank by the end user. A more convenient way to deliver these herbicides is to formulate them into a single pre-mix concentrate that can easily be measured and diluted in water by the end user prior to application by spraying.

Glyphosate containing compositions are of particular interest in burndown herbicide applications due to their wide spectrum of weed control. These compositions are made more useful by expanding their spectrum of weed control even further by the addition of an oil soluble herbicide. An oil-in-water emulsion (EW) composition may be used to combine an oil soluble herbicide and a water soluble herbicide, such as a glyphosate, into a pre-mix herbicide concentrate where droplets of oil are stabilized by surfactant emulsifiers as a discrete phase and are uniformly dispersed in water as a continuous phase.

Oil-in-water emulsions can have stability issues caused by one or more factors. Interactions or reactions of an ingredient in the aqueous phase with component(s) of the dispersed oil phase include, but are not limited to, crystal formation and growth due to Ostwald ripening of an oil phase component or an aqueous phase component, or chemical degradation of ingredients in either the oil phase or the aqueous phase. These degradations may be caused by the presence of one or more components in the oil-in-water emulsion and can lead to formulation instability. Migration of water into the oil phase and contact with the active ingredient dissolved in the oil phase or migration of the active ingredient into the water phase or to the oil-water interface can lead to one or more of active ingredient hydrolysis, crystal formation or Ostwald ripening with possible formulation instability or unsuitability for agricultural spray applications.

It can be particularly challenging to develop stable oil-in-water emulsions containing a high ionic strength aqueous solution such as, for example, a water solution containing a soluble glyphosate salt. The high ionic strength aqueous solution can destabilize the emulsion leading to coalescence of the oil droplets into larger sized oil droplets which may ultimately cause the emulsion to separate into two liquid layers. This undesired phenomenon has been attributed to the electrolyte decreasing the electrostatic repulsive force between the dispersed droplets, thus causing the droplets to agglomerate. This stability issue becomes more severe in a high load emulsion system, and at high temperature extremes. Previous efforts to combine oil soluble herbicides with aqueous solutions containing salts of glyphosate in a liquid concentrate formulation have been disclosed, for example, in U.S. Pat. No. 6,713,433 B2, U.S. Pat. Nos. 6,689,719 and 6,369,001.

High-strength formulations are desirable for a variety of economic and environmental reasons. For example, it is desirable to provide a high-strength concentrate in order to reduce shipping and handling costs and to reduce the amount of packaging material that must be disposed after use of the product. The high-strength concentrates should be stable and retain potency during storage and shipping. Furthermore, the high-strength concentrate should be a homogeneous liquid emulsion that is stable at temperatures at least as high as about 50° C. and should not exhibit any precipitation of solids at temperatures as low as about 0° C.

SUMMARY

A stable high-strength herbicidal oil-in-water emulsion is disclosed that includes:

a) a discontinuous oil phase comprising, with respect to the oil-in-water emulsion, from about 25 grams active ingredient per liter (g ai/L) to about 300 g ai/L of at least one oil soluble herbicide active ingredient and from 0 grams per liter (g/L) to about 300 g/L of a water immiscible organic solvent;

b) a continuous aqueous phase comprising, with respect to the oil-in-water emulsion, from about 260 g ai/L to about 570 g ai/L of a water soluble salt of glyphosate and from about 200 g/L to about 500 g/L of water; and c) at least two non-ionic EO/PO block copolymer emulsifying surfactants with at least one having a hydrophile lipophile balance (HLB) value of about 13 to about 16 and at least one having an HLB value of about 22 to about 29 and each having a molecular weight (mw) of about 5000 or higher, with the combined emulsifying surfactants comprising, with respect to the oil-in-water emulsion, from about 1 g/L to about 200 g/L.

Additionally, a method of preparing a stable high-strength herbicidal oil-in-water emulsion composition is disclosed that includes:

a) preparing a discontinuous oil phase comprising, with respect to the oil-in-water emulsion, from about 25 grams active ingredient per liter (g ai/L) to about 300 g ai/L of at least one oil soluble herbicide active ingredient and from 0 grams per liter (g/L) to about 300 g/L of a water immiscible organic solvent;

b) preparing a continuous aqueous phase comprising, with respect to the oil-in-water emulsion, from about 260 g ai/L to about 570 g ai/L of a water soluble salt of glyphosate and from about 200 g/L to about 500 g/L of water, and at least two non-ionic EO/PO block copolymer emulsifying surfactants with at least one having a hydrophile lipophile balance (HLB) value of about 13 to about 16 and at least one having an HLB value of about 22 to about 29 and with each having a molecular weight (mw) of about 5000 or higher, with the combined emulsifying surfactants comprising, with respect to the oil-in-water emulsion, from about 1 g/L to about 200 g/L; and c) adding the oil phase into the aqueous phase under high shear homogenization until an emulsion is achieved.

DETAILED DESCRIPTION

A high-strength, herbicidal oil-in-water emulsion pre-mix composition comprising a dispersed oil phase containing at least one oil soluble herbicide and a water immiscible organic solvent, a continuous aqueous phase containing a water soluble salt of glyphosate, and at least two non-ionic EO/PO block copolymer emulsifying surfactant, one having an hydrophile lipophile balance (HLB) value of about 13 to about 16 and the other having an HLB value of about 22 to about 29, both having a molecular weight (mw) of about 5000 or higher is disclosed. The composition may optionally include additional active ingredients and inert formulation ingredients.

The oil soluble herbicide active ingredient contained in the discontinuous oil phase of the compositions disclosed herein may generally be selected from the class of synthetic auxin and lipid synthesis inhibitor (ACCase inhibitors) herbicides. Preferred herbicide active ingredients include, but are not limited to, oil soluble derivatives of carboxylic acid herbicides, such as esters of the following: benzoic acid herbicides, such as dicamba; phenoxyalkanoic acid herbicides, such as 2,4-D, MCPA and 2,4-DB; pyridinecarboxylic acid herbicides, such as aminopyralid, picloram and clopyralid; pyridinyloxyalkanoic acid herbicides such as fluroxypyr and triclopyr; pyrimidinecarboxylic acids, such as aminocyclopyrachlor; and, esters of the aryloxyphenoxypropionic acids, such as cyhalofop, clodinafop, diclofop, fenoxaprop, fluazifop-P, haloxyfop, haloxyfop-R, metamifop, propaquizafop and quizalofop-P. Preferred oil-soluble herbicide active ingredients also include cyclohexanediones, such as cycloxydim, sethoxydim, tralkoxydim and the like. The oil soluble herbicide active ingredient of the compositions disclosed herein generally has a water solubility of less than about 3000 parts per million (ppm) and preferably less than about 1000 ppm. The oil soluble herbicide active ingredient comprises, with respect to the oil-in-water emulsion, from about 25 g ai/L to about 300 g ai/L.

The water immiscible organic solvent of the compositions disclosed herein generally has a water solubility of less than about 1000 ppm and may include, but is not limited to, one or more of petroleum fractions or hydrocarbons such as mineral oil, kerosene, paraffinic oils, mixed naphthalene and alkyl naphthalene fractions, aromatic solvents, particularly alkyl substituted benzenes such as xylene or propylbenzene fractions, and the like; heavy aromatic solvent naphtha such as Aromatic 150 fluid (Exxon Mobil Chemical; Houston, Tex.), dialkyl amides of carboxylic acids, particularly the dimethyl amides of fatty acids such as the dimethyl amide of caprylic acid and the like; vegetable, animal, algae or seed oils such as soybean oil, rape seed oil, olive oil, castor oil, sunflower seed oil, coconut oil, corn oil, cotton seed oil, linseed oil, palm oil, peanut oil, safflower oil, sesame oil, tung oil and the like; esters of the above vegetable, animal, algae or seed oils; chlorinated aliphatic and aromatic hydrocarbons such as 1,1,1-trichloroethane and chlorobenzene; ketones such as isophorone and trimethylcyclohexanone (dihydroisophorone); and acetate esters of $C_4$-$C_{10}$ alcohols such as hexyl, or heptyl acetate, and the like. In some instances, where the herbicide active ingredient is a liquid under normal operating conditions, the oil phase may contain very little or none of the water immiscible organic solvent.

Preferred water immiscible organic solvents include one or more of petroleum fractions or hydrocarbons such as mineral oil, paraffinic oils and aromatic solvents like xylene, propylbenzene fractions, alkyl naphthalene fractions, and the like; dialkyl amides of carboxylic acids, particularly the dimethyl amides of fatty acids such as the dimethyl amide of caprylic acid and the like; vegetable or seed oils such as soybean oil, rape seed oil, olive oil, castor oil, sunflower seed oil, coconut oil, corn oil, cotton seed oil, linseed oil, palm oil, peanut oil, safflower oil, sesame oil, tung oil and the like; and $C_1$-$C_5$ esters of vegetable or seed oils and the like. The water immiscible organic solvent may comprise, with respect to the oil-in-water emulsion, from about 0 g/L to about 300 g/L, preferably from about 10 g/L to about 300 g/L.

Optional ingredients that may be added to the discontinuous oil phase described herein include emulsion stabilizers such as, but not limited to, one or more low molecular weight homopolymers (<5000 mw) of the following: polyolefins, such as polybutadiene, polyisoprene, poly(substituted butadienes), such as poly(2-t-butyl-1,3-butadiene), polyethylene, chlorinated polyethylene, polypropylene, polybutene, polyisobutene, polycyclopentylethylene and polycyclolhexylethylene; polyacrylates, including polyalkylacrylates and polyarylacrylates; polymethacrylates, including polyalkylmethacrylates and polyarylmethacrylates; polydisubstituted esters, such as poly(di-n-butylitaconate) and poly(amylfumarate); polyvinylethers, such as poly(butoxyethylene) and poly(benzyloxyethylene); poly(methyl isopropenyl ketone); polyvinyl chloride; polyvinyl carboxylate esters such as polyvinyl acetate, polyvinyl propionate, polyvinyl butyrate, polyvinyl caprylate, polyvinyl laurate, polyvinyl stearate and polyvinyl benzoate; polystyrenes, like polystyrene, poly-t-butyl styrene, poly (substituted styrene) and poly(biphenyl ethylene); polycyclodienes, like poly(1,3-cyclohexadiene) and polycyclopentadiene and the like; and low molecular weight (<5000 mw) co-polymers of styrene, alkyl styrenes, isoprene, butenes, isobutenes, of which Indopol® H-15 is a preferred example (Indopol is trademark of INEOS Oligomers), butadiene, acrylonitrile, alkyl acrylates, alkyl methacrylates, vinyl chloride, vinylidene chloride, vinyl esters of lower carboxylic acids and alpha, beta-ethylenically unsaturated carboxylic acids and esters thereof, including co-polymers containing three or more different monomer species, and the like. Additional emulsion stabilizers include paraffinic hydrocarbons such as tetradecane, hexadecane and the like.

The continuous aqueous phase of the compositions disclosed hereincomprises water as the solvent medium and a water soluble salt of glyphosate. Typically, water in the aqueous phase of the emulsion formulation is used to dissolve the salt of glyphosate and any other water soluble ingredients and to balance the final composition. The continuous aqueous phase of the compositions disclosed herein may comprise, with respect to the oil-in-water emulsion, from about 200 g/L to about 500 g/L, preferably from about 200 g/L to about 400 g/L of water.

The water soluble salt of glyphosate contained in the continuous aqueous phase of the compositions disclosed hereinmay comprise one or more of an organo ammonium salt and the potassium salt of glyphosate. Suitable water soluble organo ammonium salts of glyphosate include, but are not limited to, dimethyl ammonium, isopropyl ammonium, monoethanol ammonium and the N,N,N,N-trimethylethanol ammonium (choline) salt of glyphosate. The water soluble salt of glyphosate may comprise, with respect to the oil-in-water emulsion, from about 260 g ai/L to about 570 g ai/L, preferably from about 260 g ai/L to about 450 g ai/L.

The compositions described herein also include at least two non-ionic EO/PO block copolymer emulsifying surfactants with a hydrophile lipophile balance (HLB) value of 13 or higher and a molecular weight (mw) of about 5000 or higher. The utility of non-ionic surfactants in emulsifying an oil-water mixture may in part be predicted by the Hydrophile-Lipophile Balance (HLB) values of the surfactants. The HLB value of a surfactant estimates the balance between the oil soluble and water soluble moieties in a surface active molecule (i.e., a surfactant). A more oil-soluble emulsifier will have a lower HLB value (less than about 7) and a more water-soluble emulsifier will have a larger HLB value (greater than about 7). The HLB approach is a useful method to select an emulsifier for a particular application and is more fully described in "The HLB System" an online publication available from the crodalubricants.com website at the following link: www.crodalubricants.com/download.aspx?s=133&m=doc&id=267.

The non-ionic EO/PO block copolymer emulsifying surfactants of the compositions disclosed herein include at least one surfactant with an HLB value of about 13 to about 16 and at least one surfactant with an HLB value of about 22 to about 29, with the surfactants having a molecular weight of a least about 5000. The EO/PO block copolymer emulsifying surfactants described herein include both di- and tri-block co-polymers of ethylene oxide (EO) and propylene oxide (PO). Preferred non-ionic EO/PO block copolymer surfactants of the compositions disclosed herein include, but are not limited to, Pluronic® L35, L44, L64, P65, P75, P84, P85, P104, P105, F77, F87, F88, F68, F68 LF, F98, F108, F127, 17R8 and 25R8; Tetronic® 704, 707, 904, 1104, 1107, 1307, 1504, 1508, 50R8 and 90R8; Macol® 15-20; Toximul® 8323 and 8323/33; Step-Flow® 26, 26F and 1500; Synperonic® PE 30/40, PE 30/80 and PE 39/70; Pegol® 10R8, 17R8, 25R8, F-68LF, F-108, F-127, L-10, L-35, L-44, P-65, P-75 and P-85; Antarox® 724/P, T-Det® BP-1, EPO-64 and EPO-104; Agrilan® AEC167; Monolan® 4500, 6400, 8000 E/80 and 12,000 E/80; Genapol® PF80 Powder; Hartopol® P85; Surfonic® POA-L44 and L64; Soprophor® 796P, BSU, CY8, S25 and S25/80; and Atlas® G-5000. (Pluronic, Tetronic and Macol are trademarks of BASF Aktiengesellschaft; Toximul and Step-Flow are trademarks of Stepan; Synperonic and Pegol are trademarks of Croda; Antarox and Soprophor are trademarks of Rhodia Inc., T-Det is a trademark of Harcos; Agrilan and Monolan are trademarks of Akzo Nobel; Genapol is a trademark of Clariant; Hartopol and Surfonic are trademarks of Huntsman; Atlas is a trademark of Uniqema). The non-ionic EO/PO block copolymer emulsifying surfactants of the compositions disclosed herein may comprise, with respect to the oil-in-water emulsion, from about 1 g/L to about 200 g/L, preferably from about 1 g/L to about 100 g/L.

The compositions described herein may optionally contain additional water soluble herbicide active ingredients if they cause no incompatibility or active ingredient stability issues to other ingredients of the composition. These water soluble herbicide active ingredients may be selected from, but are not limited to, alkali metal salts or amine salts of benzoic acids, phenoxyalkanoic acids, pyridinecarboxylic acids, pyrimidinecarboxylic acids and pyridinyloxycarboxylic acids such as, dicamba, 2,4-D, MCPA, 2,4-DB, aminopyralid, aminocyclopyrachlor, picloram, clopyralid, fluroxypyr and triclopyr, and alkali metal salts of bromoxynil and ioxynil. The amines are comprised of primary, secondary or tertiary alkylamines, alkanolamines, alkylalkanolamines or alkoxyalkanolamines wherein the alkyl and alkanol groups are saturated and contain $C_1$-$C_4$ alkyl groups individually. The alkali metals are comprised of sodium and potassium.

The compositions described herein may optionally contain inert formulation ingredients such as, but not limited to, adjuvants, antifoam agents, dispersants, surfactants, spray drift reduction agents, stabilizers and wetting agents. These optional inert ingredients may include surfactants conventionally used in the art of formulation that are described, inter alia, in "McCutcheon's Detergents and Emulsifiers Annual," MC Publishing Corp., Ridgewood, N.J., 1998 and in the "Encyclopedia of Surfactants," Vol. I-III, Chemical Publishing Co., New York, 1980-81. Adjuvants that are particularly well-suited for use in the compositions disclosed herein may include one or more of: alkylamine surfactants having 8 to 22 carbon atoms such as Armeen® DMTD and Duomeen® TTM; alkoxylated alkylamine surfactants having 8 to 22 carbon atoms and a total of 1-20 alkylene oxide groups such as Ethomeen® C/12, Ethomeen® T/12, Ethoduomeen® T/13 and Propomeen® T/12; etheramine surfactants such as Tomah® E-14-2, Tomah® E-14-5 and Tomah® PA-17; amine oxide surfactants such as Aromox® C/12, Aromox® DMC, Ammonyx® LO, Ammonyx® CDO and Tomah® AO-14-2; amidoamine surfactants such as Adsee® C80W; quaternary ammonium surfactants such as Arquad® T/50, Arquad® APA-E, Duoquad® T/50, Ethoquad® C/12, Ethoquad® 18/12 and Tomah® Q-14-2; amphoteric surfactants such as Dehyton® AB-30, Geronol® CF/AS 30, Tego® Betaine F 50t and Miranol® C2M-SF (Disodium Cocoampho Dipropionate); alcohol ethoxylates such as Tergitol® 15S20; alcohol ethoxylate phosphate esters such as Geranol® CF/AR; alkyl polyglycosides such as Akzo Nobel's AG 6202 and AG 6210, and Cognis' Agnique PG 8107-U ($C_{8-16}$ alkyl polyglucoside in which the alkyl group contains 8 to 10 carbon atoms and having an average degree of polymerization of 1.7); and ester derivatives of alkyl polyglycosides such as the Eucarol® AGE surfactants. (Armeen, Duomeen, Ethomeen, Ethoduomeen, Propomeen, Aromox, Arquad, Duoquad, Ethoquad and Adsee are trademarks of Akzo Nobel; Tomah is a trademark of Air Products; Ammonyx is a trademark of Stepan; Dehyton and Agnique are a trademarks of Cognis; Geronol and Miranol are trademarks of Rhodia Inc.; Tego is a trademark of Goldschmidt; Tergitol is a trademark of The Dow Chemical Company; Eucarol is a trademark of Lamberti)

The compositions disclosed herein provide a high-strength herbicidal oil-in-water emulsion composition that is storage stable at high temperatures. That is, the composition forms a stable, homogeneous emulsion that does not exhibit coalescence under the storage conditions. More preferably, the composition described herein is stable at temperatures of greater than or equal to about 40° C. for a period of at least 4 weeks, more preferably, at temperatures greater than or equal to about 54° C. for a period of at least about 4 weeks.

Furthermore, the high-strength oil-in-water emulsion composition described herein also does not exhibit separation or precipitation (or crystallization) of any of the components at low temperatures. For example, the composition remains a homogeneous emulsion at temperatures below about 20° C., more preferably at temperatures below about 10° C. and most preferably at a temperature equal to or less than about 5° C. for a period of at least about 4 weeks.

In a typical procedure for preparing the high-strength oil-in-water emulsion compositions described herein, the aqueous phase is prepared by mixing the water with water soluble or water dispersible ingredients including, but not limited to, water soluble or water dispersible dispersing or emulsifying surfactants, water soluble active ingredients and optionally, other inert ingredients such as thickeners, pH buffers, wetting agents, antifreeze agents, antifoam agents, biocides, etc. The oil phase is prepared by mixing the oil-soluble emulsifying surfactants with oil miscible or soluble ingredients, including but not limited to, water immiscible organic solvents and oil soluble active ingredients. The final emulsion formulation is prepared by slowly adding the oil phase into the aqueous phase under high shear homogenization until a desired emulsion droplet size is achieved. Emulsion droplet sizes can be, for example, between 0.1 μm and 5 μm, between 0.1 μm and 4 μm, 0.1 μm and 3 μm, 0.1 μm and 2 μm, or 0.1 μm and 1 μm.

An example of a stable, high-strength oil-in-water emulsion composition described herein in which coalescence of the dispersed oil phase and crystallization and Oswald ripening of an oil soluble active ingredient is retarded comprises:

a) a discontinuous oil phase comprising, with respect to the oil-in-water emulsion, from about 25 g ai/L to about 300 g ai/L of fluroxypyr-meptyl and from about 1 g/L to about 300 g/L of naphthalene depleted Aromatic 150 fluid;

b) a continuous aqueous phase comprising, with respect to the oil-in-water emulsion, from about 310 g ai/L to about 570 g ai/L of glyphosate dimethyl ammonium and from about 200 g/L to about 500 g/L of water;

c) two non-ionic EO/PO block copolymer emulsifying surfactants with at least one having a hydrophile lipophile balance (HLB) value of about 13 to about 16 and at least one having an HLB value of about 22 to about 29 and with each surfactant having a molecular weight (mw) of about 5000 or higher together comprising, with respect to the oil-in-water emulsion, from about 1 g/L to about 200 g/L each of Pluronic® F68 LF and Soprophor® 796/P; and d) optionally, other inert formulation ingredients.

In addition to the compositions and uses set forth above, also described herein are compositions and use of oil-in-water emulsions in combination with one or more additional compatible ingredients. Other additional ingredients may include, for example, one or more other pesticides, dyes, and any other additional ingredients providing functional utility, such as, for example, stabilizers, compatibility agents, fragrants, viscosity-modifying additives, suspension aids, dispersants, and freeze-point depressants.

The aqueous herbicidal compositions described herein may optionally be diluted in an aqueous spray mixture for agricultural application such as for burndown weed control in crop fields prior to planting. Such compositions are typically diluted with an inert carrier, such as water, before application. The diluted compositions, which are usually applied to weeds, the locus of weeds or the locus of where weeds may eventually emerge, generally contain about 0.0001 to about 1 weight percent active ingredient and preferably contain about 0.001 to about 0.05 weight percent active ingredient. The compositions disclosed herein can be applied to weeds or their locus by the use of conventional ground or aerial sprayers, by addition to irrigation water and by other conventional means known to those skilled in the art.

The herbicidal compositions described herein may be applied in conjunction with one or more other herbicides to control a wider variety of undesirable vegetation. When used in conjunction with other herbicides, the presently claimed compositions can be formulated with the other herbicide or herbicides as premix concentrates, tank mixed with the other herbicide or herbicides for spray application or applied sequentially with the other herbicide or herbicides in separate spray applications.

The following Examples are presented to illustrate various aspects of the compositions and methods described herein and should not be construed as limitations to the claims.

Example 1

Preparation of a Stable Oil-in-Water Emulsion Containing Glyphosate Dimethyl Ammonium (DMA) and Fluroxypyr Meptyl (MHE)

A glyphosate DMA salt concentrate was prepared by mixing 247.4 g glyphosate acid technical (purity 97%) with 1.1 molar equivalents of dimethylamine aqueous solution (40% in water) to form a homogeneous clear solution at ambient temperature. To the glyphosate DMA solution were then added 31.2 g of Agnique® PG 8107-U (Agnique is a registered trademark of Cognis) and 154.9 g of water to achieve a concentration of 608 g ai/L [480 grams acid equivalent per liter (g ae/L)] of glyphosate DMA. An oil phase was prepared by dissolving 35.6 g of fluroxypyr MHE (purity 97.1%) in 53.4 g of Aromatic 150 ND fluid (ExxonMobil Chemical Company; Houston, Tex.) containing 13.7 g of Pluronic® F68 LF (Pluronic is a registered trademark of BASF Aktiengesellschaft), 5.1 g of Soprophor® 796/P (Soprophor is a registered trademark of Rhodia Inc) and 3.4 g of Indopol® H15 (Indopol is a registered trademark of INEOS Oligomers) to provide a solution while maintaining the temperature at 50° C. Finally, to prepare a 300 mL sample (Sample A in Table 1) of an oil-in-water emulsion containing 115 g ai/L [80 g ae/L] of fluroxypyr MHE and 380 g ai/L [300 g ae/L] of glyphosate DMA, respectively, the above oil phase containing fluroxypyr MHE was slowly added into 229 g of the glyphosate DMA salt concentrate at 7,000-11,000 rpm (depending on the desired emulsion size) by using a Silverson high-shear homogenizer. 1.8 g water was eventually added to achieve the desired concentration. A stable, homogenous oil-in-water emulsion concentrate containing fluroxypyr MHE and glyphosate DMA was generated in this manner.

TABLE 1

Oil-in-Water Emulsion Concentrates (ingredients in weight percent)

| Component | Sample A[1] | Sample B[1] | Sample C[2] | Sample D[2] | Sample E[3] |
|---|---|---|---|---|---|
| Fluroxypyr-meptyl | 10.1 | 10.1 | 7.7 | 7.7 | / |
| Haloxyfop-R-methyl | / | / | / | / | 2.4 |
| Glyphosate DMA | 33.3 | 33.3 | 31.4 | 31.4 | 33.3 |
| Agnique ® PG 8107-U | 5.5 | 5.5 | 5.2 | 5.2 | 5.5 |
| Pluronic ® F-68 LF | 4.0 | / | 4.0 | / | 7.2 |
| Pluronic ® P-104 | / | 3.9 | / | 4.0 | / |
| Soprophor ® 796P | 1.5 | 1.0 | 1.5 | 1.0 | 1.8 |
| Aromatic 150 ND | 15.8 | 16.1 | 16.7 | 18.3 | 14.8 |
| Indopol ® H-15 | 1.0 | / | 1.0 | / | / |
| water | 28.8 | 30.1 | 32.5 | 32.4 | 35.0 |

[1]Samples A and B contain 115 grams active ingredient per liter (g ai/L) of fluroxypyr meptyl and 380 g ai/L of glyphosate dimethyl ammonium (DMA).
[2]Samples C and D contain 86 g ai/L of fluroxypyr meptyl and 355 g ai/L of glyphosate DMA.
[3]Sample E contains 29 g ai/L of haloxyfop-R-methyl and 380 g ai/L of glyphosate DMA.

The homogenous oil-in-water emulsion concentrates (Samples A, B, C, D and E) thus prepared were stable to coalescence and crystallization while stored at 54° C. for 4 weeks or while stored at 5° C. for 4 weeks.

The present invention is not limited in scope by the embodiments disclosed herein which are intended as illustrations of a few aspects of the invention and any embodiments which are functionally equivalent are within the scope of this invention. Various modifications of the compositions and methods in addition to those shown and described herein will become apparent to those skilled in the art and are intended to fall within the scope of the appended claims.

Further, while only certain representative combinations of the composition components and method steps disclosed herein are specifically discussed in the embodiments above, other combinations of the composition components and method steps will become apparent to those skilled in the art and also are intended to fall within the scope of the appended claims. Thus a combination of components or method steps may be explicitly mentioned herein; however, other combinations of components and method steps are included, even though not explicitly stated. The term "comprising" and variations thereof as used herein is used synonymously with the term "including" and variations thereof and are open, non-limiting terms.

What is claimed:

1. A stable high-strength herbicidal oil-in-water emulsion composition comprising:
   a) a discontinuous oil phase comprising from about 25 grams active ingredient per liter (g ai/L) to about 300 g ai/L of an oil soluble herbicide active ingredient and from about 10 grams per liter (g/L) to about 300 g/L of a water immiscible organic solvent by weight of the total emulsion composition;
   b) a continuous aqueous phase comprising from about 260 g ai/L to about 570 g ai/L of a water soluble salt of glyphosate by weight of the total emulsion composition and from about 200 g/L to about 500 g/L of water by weight of the total emulsion composition; and
   c) a first non-ionic EO/PO block copolymer emulsifying surfactant having a hydrophile lipophile balance (HLB) value of about 13 to about 16 and a second non-ionic EO/PO block copolymer emulsifying surfactant having an HLB value of about 22 to about 29 and with each having a molecular weight (mw) of about 5000 or higher, with the combined emulsifying surfactants comprising from about 1 g/L to about 200 g/L by weight of the total emulsion composition,
   wherein the emulsion composition has a droplet size between 0.1 μm and 5 μm.

2. The composition of claim 1, wherein the oil soluble herbicide active ingredient is a synthetic auxin or a lipid synthesis inhibitor herbicide.

3. The composition of claim 1, wherein the oil soluble herbicide active ingredient has a water solubility of less than about 3000 parts per million (ppm).

4. The composition of claim 1, wherein the water immiscible organic solvent has a water solubility of less than about 1000 ppm.

5. The composition of claim 1, wherein the discontinuous oil phase includes the water immiscible organic solvent in an amount of about 300 grams per liter by weight of the total emulsion composition.

6. The composition of claim 1, wherein the discontinuous oil phase further includes an emulsion stabilizer.

7. The composition of claim 1, wherein the continuous aqueous phase includes from about 200 g/L to about 400 g/L of water.

8. The composition of claim 1, wherein the water soluble salt of glyphosate is an organo ammonium salt or a potassium salt.

9. The composition of claim 8, wherein the organo ammonium salt is a dimethyl ammonium, a isopropyl ammonium, a monoethanol ammonium, or a N,N,N,N-trimethylethanol ammonium (choline) salt.

10. The composition of claim 1, wherein the continuous aqueous phase includes about 260 g ai/L to about 450 g ai/L of the water soluble salt of glyphosate.

11. The composition of claim 1, wherein the first and the second non-ionic EO/PO block copolymer emulsifying surfactants include both di- and tri-block co-polymers of ethylene oxide (EO) and propylene oxide (PO).

12. The composition of claim 1, wherein the combined emulsifying surfactants comprise from about 1 g/L to about 100 g/L of the total composition.

13. The composition of claim 1, further including additional water soluble herbicide active ingredients.

14. The composition of claim 1, wherein the composition is stable at temperatures of greater than or equal to about 40° C. for a period of at least 4 weeks.

15. The composition of claim 1, wherein the composition does not exhibit separation or precipitation or crystallization at temperatures below about 20° C.

16. The composition of claim 1, wherein the discontinuous oil phase comprises fluroxypyr-meptyl and naphthalene depleted Aromatic 150 fluid, and the continuous aqueous phase comprises glyphosate dimethyl ammonium and water.

17. A method of preparing a stable high-strength herbicidal oil-in-water emulsion composition comprising:
   a) preparing a discontinuous oil phase comprising from about 25 grams active ingredient per liter (g ai/L) to about 300 g ai/L of an oil soluble herbicide active ingredient by weight of the total emulsion composition and from about 10 grams per liter (g/L) to about 300 g/L of a water immiscible organic solvent by weight of the total emulsion composition;
   b) preparing a continuous aqueous phase comprising from about 260 g ai/L to about 570 g ai/L of a water soluble salt of glyphosate and from about 200 g/L to about 500 g/L of water by weight of the total emulsion composition, and a first non-ionic EO/PO block copolymer emulsifying surfactant having a hydrophile lipophile balance (HLB) value of about 13 to about 16 and a second non-ionic EO/PO block copolymer emulsifying surfactant having an HLB value of about 22 to about 29 and with each having a molecular weight (mw) of about 5000 or higher, with the combined emulsifying surfactants comprising from about 1 g/L to about 200 g/L by weight of the total emulsion composition; and
   c) adding the oil phase into the aqueous phase under high shear homogenization until an emulsion is achieved, wherein the emulsion composition has a droplet size is between 0.1 μm and 5 μm.

18. A stable high-strength herbicidal oil-in-water emulsion composition comprising:
   a) a discontinuous oil phase comprising from about 25 grams active ingredient per liter (g ai/L) to about 300 g ai/L of fluroxypyr by weight of the total emulsion composition and from about 10 grams per liter (g/L) to about 300 g/L of a water immiscible organic solvent by weight of the total emulsion composition;
   b) a continuous aqueous phase comprising from about 260 g ai/L to about 570 g ai/L of a water soluble salt of glyphosate by weight of the total emulsion composition and from about 200 g/L to about 500 g/L of water by weight of the total emulsion composition; and
   c) a first non-ionic EO/PO block copolymer emulsifying surfactant having a hydrophile lipophile balance (HLB) value of about 13 to about 16 and a second non-ionic EO/PO block copolymer emulsifying surfactant having an HLB value of about 22 to about 29 and with each having a molecular weight (mw) of about 5000 or higher, with the combined emulsifying surfactants comprising from about 1 g/L to about 200 g/L by weight of the total emulsion composition, wherein the emulsion composition is a homogeneous liquid emulsion between 0° C. to 54° C.

19. The composition of claim 18, wherein the emulsion composition remains a homogeneous liquid emulsion between 5° C. to 54° C. when stored for four weeks.

* * * * *